2,969,370
PROCESS FOR THE PREPARATION OF 2-AMINO-5-CHLOROBENZOXAZOLE

Edgar C. Britton, Donald D. Wheeler, and David C. Young, Midland, Mich., assignors to The Dow Chemical Company, Midland, Mich., a corporation of Delaware No Drawing. Filed Feb. 14, 1957, Ser. No. 640,072

7 Claims. (Cl. 260—307)

The invention relates to processes for converting 2,5-dichlorobenzoxazole to 2-amino-5-chlorobenzoxazole, The latter is a well known drug.

According to the invention, 2,5-dichlorobenzoxazole is treated with ammonia at a temperature of 0°–60° C., whereby the 2-chlorine is replaced with an amino group:

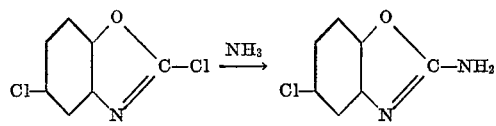

While the reactants may be dissolved in a suitable mutual solvent, such as a lower aliphatic alcohol, we generally prefer to avoid the use of solvents. If a solvent is to be used, we prefer methanol because it is an excellent solvent for ammonia and is easy to remove from the product. Other lower alkanols, such as ethanol, propanol and isopropanol, may be used instead of methanol if desired. It is essential to use a large excess of ammonia over that theoretically required. We use at least 3, and preferably at least 10 molar equivalents of ammonia, since lower ratios result in reduced yield and purity of the product.

The purity of the 2,5-dichlorobenzoxazole used is important if the highest yield and purity of product are to be obtained. To assure such purity, we prefer to distill the dichloro compound under reduced pressure (10–50 mm.) before using it.

The reaction temperature and time are inversely related and it is desirable to keep both to a minimum, consistent with completion of the reaction. While the temperature may be anywhere in the range of 0–60° C., it has been found that at or near zero the reaction is undesirably slow while near the upper limit of 60° the product may be damaged, resulting in higher color and lower purity. The preferred temperature is approximately ordinary room temperature, i.e., about 20–30° C. At this temperature the reaction goes substantially to completion in about 6 hours, the yield and purity of product are high and little or no discoloration is apparent.

When the reaction is conducted in methanol or other solvent, it is not necessary to use superatmospheric pressure, though it is desirable to do so in order to maintain a higher concentration of ammonia in the system. When no solvent is used, pressure is essential in order to confine the ammonia at reaction temperature.

The process of the invention is illustrated by the following examples wherein all weights are in grams and temperatures are in ° C.

Example 1

One mole of 2,5-dichlorobenzoxazole was melted and poured slowly, with stirring, into a solution of 4 moles of ammonia in 800 ml. of methanolic solution, the latter being initially at 10°. The resulting solution was heated 1 hour at 45° C. after which the product was precipitated by pouring the solution into a large volume of cold water. The yield was 85 percent and the product had a melting point of 180–183° and was colorless.

Example 2

When the procedure of Example 1 was repeated except that 2.4 moles of ammonia in 560 ml. of methanolic solution was used, the same yield was obtained but the product was quite impure, having a melting point of 120–140°.

Example 3

In a procedure similar to that of Example 1, 3.4 moles of ammonia in 400 ml. of methanolic solution were used and the reaction time and temperature were 6 hours and 25°, respectively. The yield was 88 percent and the melting point 175–182°.

Example 4

The procedure of Example 3 was repeated except that 6.7 moles of ammonia in 800 ml. of methanolic solution were used. The yield was 86 percent and the melting point 182–185°.

Example 5

The procedure of Example 3 was repeated except that 13.5 moles of ammonia in 1600 ml. of methanolic solution were used. The yield was 86 percent and the melting point was 185–187°.

Example 6

The procedure of Example 5 was repeated except that after the reaction was complete the solvent was distilled under reduced pressure and at a pot temperature of 40° while 1.1 moles of sodium hydroxide dissolved in 1600 ml. of water was added during the distillation at a rate such that the total volume of the mixture remained substantially constant. The yield was 83 percent and the melting point was 183–185°.

Example 7

A stainless steel bomb was cooled with Dry Ice and charged with 0.5 m. (94 g.) of 2,5-dichlorobenzoxazole and 7.5 m. (130 g.) of liquid ammonia. The bomb was sealed and rocked for 6 hours at 27°. The unreacted ammonia was then allowed to evaporate and the product was dissolved in methanol. The solution thus obtained was evaporated to about 100 ml. and 1000 ml. of water was added. The solid thus precipitated was washed with water and then dissolved in 500 ml. of warm methanol and decolorized with carbon. The methanol was then distilled at 40° under reduced pressure while 500 ml. of 0.1 N NaOH were added to maintain constant volume. The solid thus precipitated was collected, washed successively with water, dilute acetic acid and water, and dried. Yield, 92.5 percent; melting point, 183–185°.

We have found that the presence of small amounts of water in the reaction mixture is of no particular significance. Larger amounts reduce the solubility of the 2,5-dichlorobenzoxazole and the 2-amino-5-chlorobenzoxazole and slow down the reaction. If the amount of water exceeds about 15 percent of the reaction mixture the latter will usually separate into two phases and the rate of reaction, yield and purity of product are all drastically lowered.

We claim:

1. A process comprising contacting 2,5-dichlorobenzoxazole with ammonia at a temperature of 0–60° C. and in the presence of not more than 15% of water, by weight, based on the entire reaction mixture and recovering the thus formed 2-amino-5-chlorobenzoxazole.

2. A process as defined in claim 1 wherein the ammonia is substantially solvent-free liquid ammonia.

3. A process as defined in claim 1 wherein the ammonia is dissolved in a lower alkanol.

4. A process as defined in claim 3 wherein the alkanol is methanol.

5. A process as defined in claim 1 wherein the molar ratio of ammonia to 2,5-dichlorobenzoxazole is at least 3:1.

6. A process as defined in claim 1 wherein the temperature is 20–30° C.

7. A process comprising contacting 2,5-dichlorobenzoxazole with at least about 10 molar equivalents of substantially solvent-free liquid ammonia at a temperature of about 20–30° C. for a time of about 4–6 hours and recovering the thus formed 2-amino-5-chlorobenzoxazole.

References Cited in the file of this patent

UNITED STATES PATENTS

| | | |
|---|---|---|
| 2,780,633 | Sam | Feb. 5, 1957 |
| 2,890,985 | Marsh et al. | June 16, 1959 |

FOREIGN PATENTS

| | | |
|---|---|---|
| 424,476 | Great Britain | Feb. 21, 1935 |

OTHER REFERENCES

Cerniani et al.: Chem. Abstracts, vol. 49, col. 4626 (1955).

Houben: Die Methoden der Org. Chem., 3rd ed., vol. 4 (1941), pp. 350–358.

Norris: Organic Chemistry (McGraw-Hill), 2nd ed., (1922), p. 443.

Elderfield: Heterocyclic Compounds, vol. 5 (1957), pp. 447–449. (Referring to Seidel, J. prakt. Chem. (2), vol. 42, p. 456 (1890).)

Elderfield: Heterocyclic Compounds, vol. 5, pp. 438–9, 519, (1957).